(12) United States Patent
Weidman et al.

(10) Patent No.: US 8,376,121 B2
(45) Date of Patent: Feb. 19, 2013

(54) CONVEYOR BELT SYSTEM WITH LANE DIVIDER

(75) Inventors: Michael Weidman, Crestwood, KY (US); Edward A. Robinson, Louisville, KY (US)

(73) Assignee: Raque Food Systems, Inc., Louisville, KY (US)

( * ) Notice: Subject to any disclaimer, the term of this patent is extended or adjusted under 35 U.S.C. 154(b) by 425 days.

(21) Appl. No.: 12/629,536

(22) Filed: Dec. 2, 2009

(65) Prior Publication Data

US 2011/0127142 A1    Jun. 2, 2011

(51) Int. Cl.
*B65G 47/26* (2006.01)
(52) U.S. Cl. ............... 198/457.05; 198/367; 198/458
(58) Field of Classification Search ............... 198/367, 198/442, 457.01, 457.05, 473.1, 599, 803.14, 198/633, 636, 459.5, 458, 436, 443, 456, 198/434; 209/658
See application file for complete search history.

(56) References Cited

U.S. PATENT DOCUMENTS

| | | |
|---|---|---|
| 461,924 A | 10/1891 | Cummings |
| 1,733,409 A | 10/1929 | Howe |
| 1,822,111 A | 9/1931 | Richardson et al. |
| 1,871,902 A | 8/1932 | Mojonnier |
| 1,930,318 A | 10/1933 | Mojonnier |
| 2,038,652 A | 4/1936 | Froehlich |
| 2,451,104 A | 10/1948 | Lowe |
| 2,558,774 A * | 7/1951 | Nordquist et al. ............ 198/416 |
| 2,701,638 A | 2/1955 | Petro |
| 3,326,349 A | 6/1967 | Pettis et al. |
| 3,749,225 A | 7/1973 | Kennedy |
| 4,321,994 A | 3/1982 | Heuft |
| 4,443,995 A * | 4/1984 | Myers et al. .................... 53/443 |
| 4,462,516 A * | 7/1984 | Guerzoni ..................... 198/427 |
| 4,566,582 A | 1/1986 | Linder |
| 5,186,306 A | 2/1993 | Sjöstrand |
| 5,988,356 A | 11/1999 | Bonnet |
| 7,591,363 B2 * | 9/2009 | Wild et al. ............... 198/370.08 |
| 2005/0247542 A1 | 11/2005 | Salvoni |
| 2007/0084698 A1 * | 4/2007 | Aubry et al. ............... 198/459.1 |
| 2008/0023305 A1 | 1/2008 | Wild et al. |

* cited by examiner

*Primary Examiner* — Gene Crawford
*Assistant Examiner* — William R Harp
(74) *Attorney, Agent, or Firm* — Taft, Stettinius & Hollister LLP; Ryan O. White (57) ABSTRACT

A system for dividing a flow of objects into two or more lanes of object flow, the system comprising a first conveyor configured to transport a plurality of objects, the conveyor having a transportation plane and plurality of substantially planar regions elevated above and substantially parallel to the transportation plane, the plurality of substantially planar regions each being configured to hold at least one of the plurality of objects being transported; a second conveyor substantially adjacent to the first conveyor; and a guide mounted above the transportation plane and the planar regions of the first conveyor, the guide configured to divert an object positioned on one of the substantially planar regions elevated above the transportation plane onto the second conveyor.

9 Claims, 7 Drawing Sheets

CONVEYOR BELT SYSTEM WITH LANE DIVIDER

FIELD OF THE INVENTION

The present invention relates generally to apparatuses and methods for dividing or diverting incoming objects from one or more conveyor belt production lines into a plurality of subsequent conveyor belt lines.

BACKGROUND

Conveyor belt systems are commonly used within the manufacturing industry to distribute and handle goods. Depending on the specific operation involved, it is sometimes desirable to divide or separate at least a portion of the goods from a first conveyor belt to one or more subsequent conveyor belts. However, it is sometimes difficult to effectively transport goods along multiple channels without interrupting the distribution flow.

The present invention is intended to overcome or ameliorate the prior art disadvantages discussed above or to provide a useful alternative thereto.

SUMMARY OF THE INVENTION

In accordance with one aspect of the present invention, a system for dividing a flow of objects into two or more lanes of object flow is provided. The system comprises a first conveyor configured to transport a plurality of objects, the conveyor having a transportation plane and a plurality of substantially planar regions elevated above and substantially parallel to the transportation plane, the plurality of substantially planar regions each being configured to hold at least one of the plurality of objects being transported; a second conveyor substantially adjacent to the first conveyor; and a guide mounted above the transportation plane and the planar regions of the first conveyor, the guide configured to divert an object positioned on one of the substantially planar regions elevated above the transportation plane onto the second conveyor.

In accordance with yet another aspect of the present invention, a method for dividing a flow of objects into two or more lanes of object flow is provided. The method comprises the steps of transporting a plurality of objects along a first transportation path of a first conveyor; diverting an object positioned on a substantially planar region elevated above and substantially parallel to a transportation plane of the first conveyor along a second transportation path; and receiving one or more objects diverted along the second transportation path with a second conveyor.

In accordance with still another aspect of the present invention, an apparatus for dividing a flow of objects into two or more lanes of object flow is provided. The apparatus comprises a first conveyor configured to transport a plurality of objects, the first conveyor including a plurality of substantially elevated planar regions each being configured to hold at least one of the plurality of objects; a second conveyor substantially adjacent to the first conveyor; and a guide for diverting an object positioned on one of the elevated planar regions of the first conveyor onto the second conveyor.

BRIEF DESCRIPTION OF DRAWINGS

The above-mentioned aspects of the present teachings and the manner of obtaining them will become more apparent and the teachings will be better understood by reference to the following description of the embodiments taken in conjunction with the accompanying drawings, wherein.

DETAILED DESCRIPTION

The embodiments of the present teachings described below are not intended to be exhaustive or to limit the teachings to the precise forms disclosed in the following detailed description. Rather, the embodiments are chosen and described so that others skilled in the art may appreciate and understand the principles and practices of the present teachings.

Figure 1:
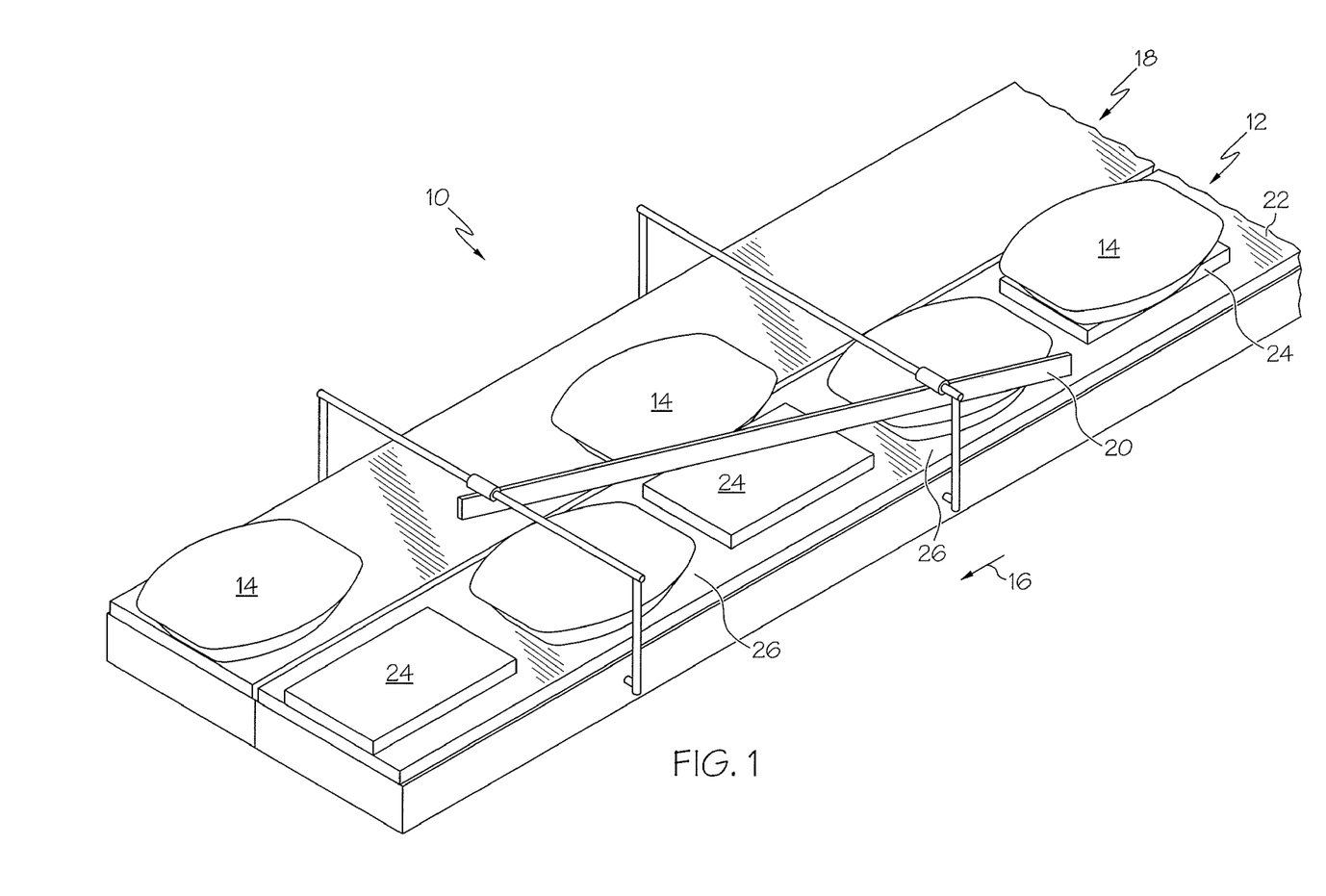
FIG. 1 is a perspective view of a conveyor belt system in accordance with the teachings of the present invention.

Referring to FIG. 1, a perspective view of a first embodiment of a conveyor belt system 10 in accordance with the teachings of the present invention is shown. According to this aspect of the invention, a first conveyor belt 12 carries a series of goods 14 along direction 16, while a second conveyor belt 18 is positioned substantially adjacent to the first belt and configured to receive at least a portion of the goods 14 that have been diverted off of the first conveyor belt. To divert or deflect a portion of the goods 14 from the first conveyor belt 12 to the second conveyor belt 18, a rod or guide bar 20 is positioned across the top surface of transportation plane 22 of the first conveyor belt 12. As the goods 14 advance along the first conveyor belt 12 in the direction of arrow 16, some of the goods 14 physically contact the guide bar 20, and are thereby caused to change course and divert onto the second conveyor belt 18.

It should be understood and appreciated that any type of object positionable as a physical barrier and extendable across at least a portion of the conveyor belt can be used as the rod or guide bar 20 for diverting a portion of the goods 14 onto a subsequent conveyor belt in accordance with the present invention. For instance, the rod or guide bar 20 can be an elongated bar that is connected to a frame that is disposed around the conveyor belt assembly 10. Moreover, it is envisioned that any type of solid material (e.g., wood, metal and/or plastic) can be used to construct the rod or guide bar 20 in accordance with the teachings of the present invention, as long as such material is structurally able to cause any items or goods that impact its surface to change course and divert along an intended transportation path or channel.

As mentioned above, only a portion of the goods 14 are configured to directly impact the guide bar 20 and thereby be caused to deflect onto the second conveyor belt 18. The goods 14 that do not directly impact the guide bar 20 maintain their respective position on the first conveyor belt 12, while the goods impacting the guide bar 20 are encouraged to change direction and advance to a subsequent belt (e.g., second conveyor belt 18). To determine whether an individual good 14 will impact the guide bar 20 and deflect onto a second or subsequent belt depends upon whether or not that good is positioned on a raised section 24 of the belt. More particularly, and in accordance with this aspect of the present invention, the first conveyor belt 12 is divided into various sections or regions, some of which are elevated or raised from the top surface 22 of the belt 12. For instance, and with reference to FIG. 1, various raised sections 24 of the first conveyor belt 12 are slightly elevated from the top surface (transportation plane) 22 of the belt. When a good 14 is positioned on a raised section 24 of the belt 12, the good is configured to impact the guide bar 20 when it reaches the portion of the belt which the guide bar intersects. On the other hand, when a good 14 is positioned on a non-raised section 26 of the belt, the good 14 is configured to pass underneath the guide bar 20, and thereby not be shifted onto a subsequent belt. The second conveyor belt 18 is configured such that it is positioned at substantially the same elevation as the non-raised sections 26 of the first conveyor belt 12.

According to certain specific aspects of the present invention, the raised sections 24 of the first conveyor belt 12 may be in the form of platforms or stages that are raised above the transportation surface 22 of the belt. However, it should be understood and appreciated that any structure or shape having a substantially horizontal or planar surface that is raised above the transportation surface 22 of the belt and configured to hold a good can be used in accordance with the teachings of the present invention.

Figure 2:
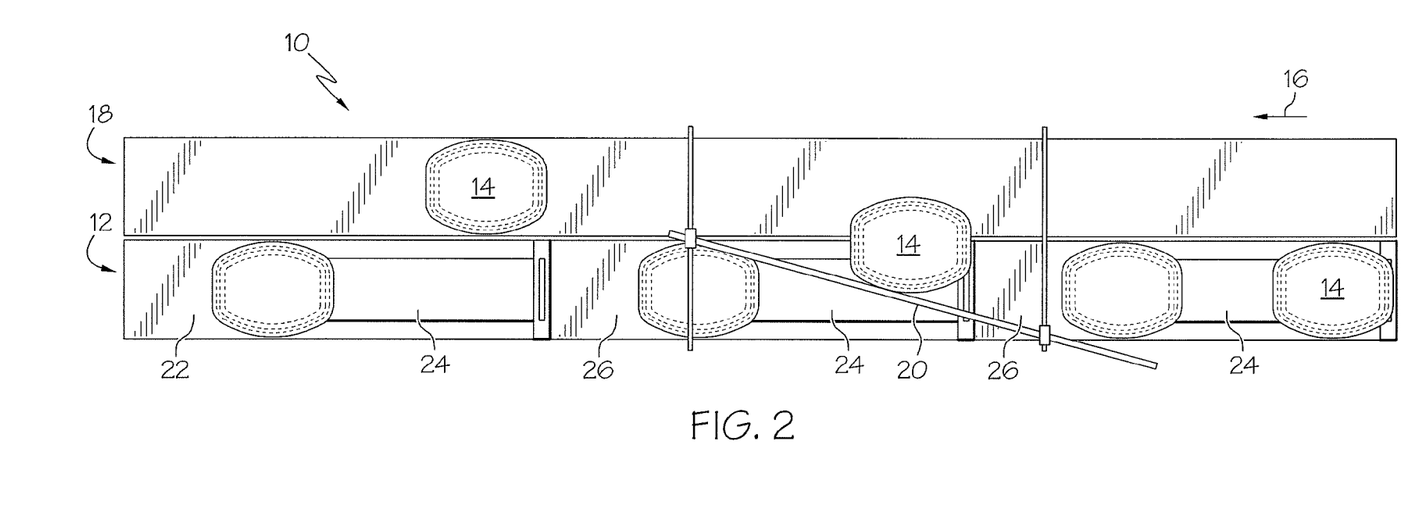
FIG. 2 is a top view of the conveyor belt system of FIG. 1.

FIG. 2 shows a top view of the exemplary embodiment of the invention described above. As can be clearly seen from this view, once a good 14 reaches the position along the course of transportation in which the guide bar 20 intersects the first belt 12, that good will be diverted or deflected onto the second belt 18 if the good is positioned on a raised section 24. In other words, the guide bar 20 functions as a physical barrier that will not allow the good 14 to continue along the course of the first belt 12 if that good is positioned at an elevation that is the same or slightly higher than the elevation of the guide bar 20 above the transportation surface 22 of the belt. Because the guide bar 20 is angled in a direction that terminates into the second conveyor belt 18, when the good 14 physically impacts the guide bar 20, the good 14 is forced to deflect along the guide bar 20 and into the direction of (and ultimately onto) the second conveyor belt 18.

Figure 3:
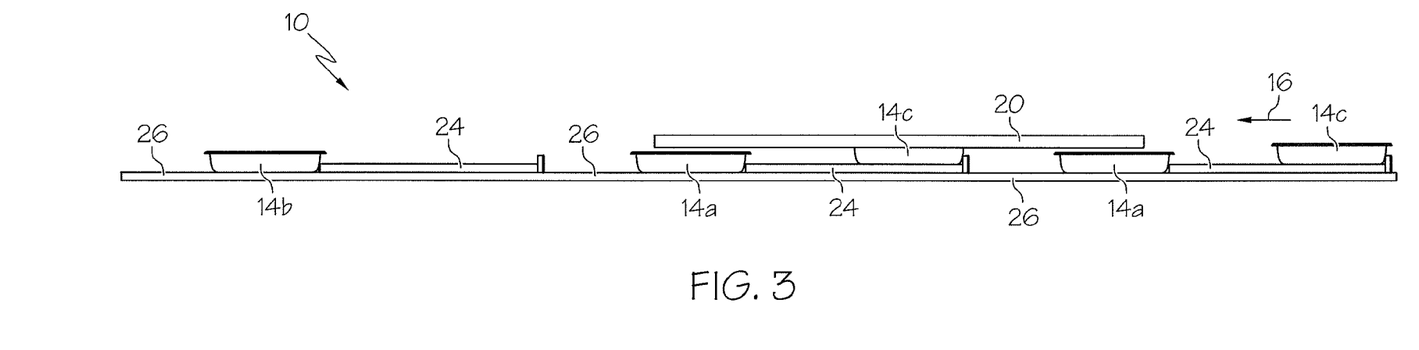
FIG. 3 is a side view of the conveyor belt system of FIG. 1.

FIG. 3 depicts a side view of the conveyor belt system 10 of FIG. 1. As shown in FIG. 3, two goods 14a are positioned on non-raised sections 26 of the belt 12 and are thereby able to pass underneath the guide bar 20 without being physically shifted or deflected onto the second conveyor belt 18. In fact, one good (shown as 14b) has already passed underneath the guide bar 20 and is still securely positioned on the first conveyor belt 12. The goods 14c located on the raised sections 24 of the first conveyor belt 12, however, are configured to directly impact the guide bar 20, and thereby subsequently shift onto the second conveyor belt 18.

Figure 4:
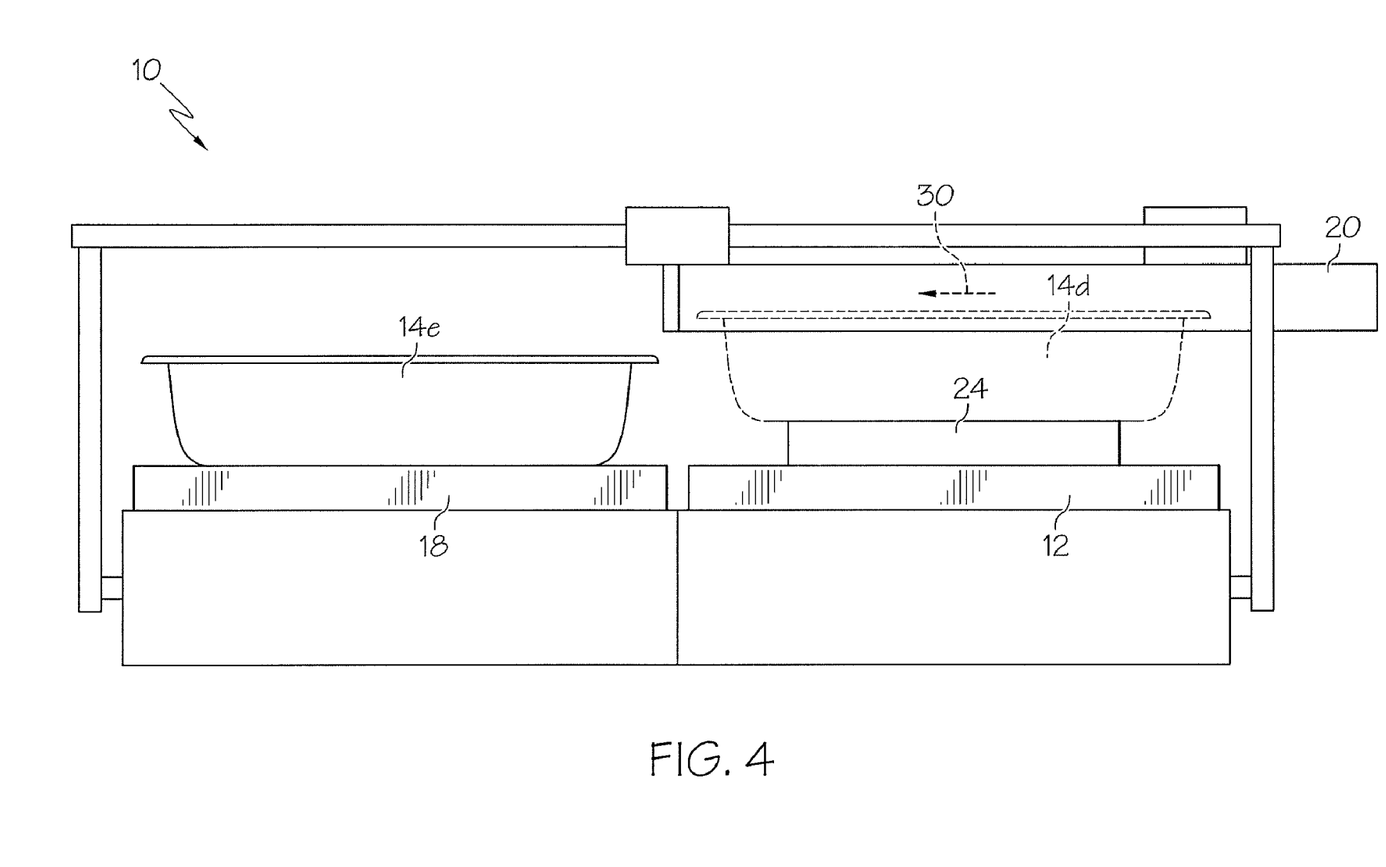
FIG. 4 is a front view of the conveyor belt system of FIG. 1.

FIG. 4 shows a front view of the conveyor belt system 10 of FIG. 1. According to this exemplary illustration, a good 14d (shown in dashed lines) that is positioned on a raised section 24 of the belt 12 contacts the guide bar 20 that is suspended over the belt. Upon impacting the guide bar 20, the good 14d is diverted or shifted onto the second belt 18 along the direction of arrow 30. The diverted good is shown on the second belt as reference numeral 14e.

While the above-described embodiments of the present invention illustrate a two lane conveyor belt system, it should be understood and appreciated that other conveyor belt arrangements having multiple (e.g., more than two) lanes or belts can also be used and still adhere to the scope and teachings of the present invention. As such, the present invention is not intended to be limited herein.

Figure 5:
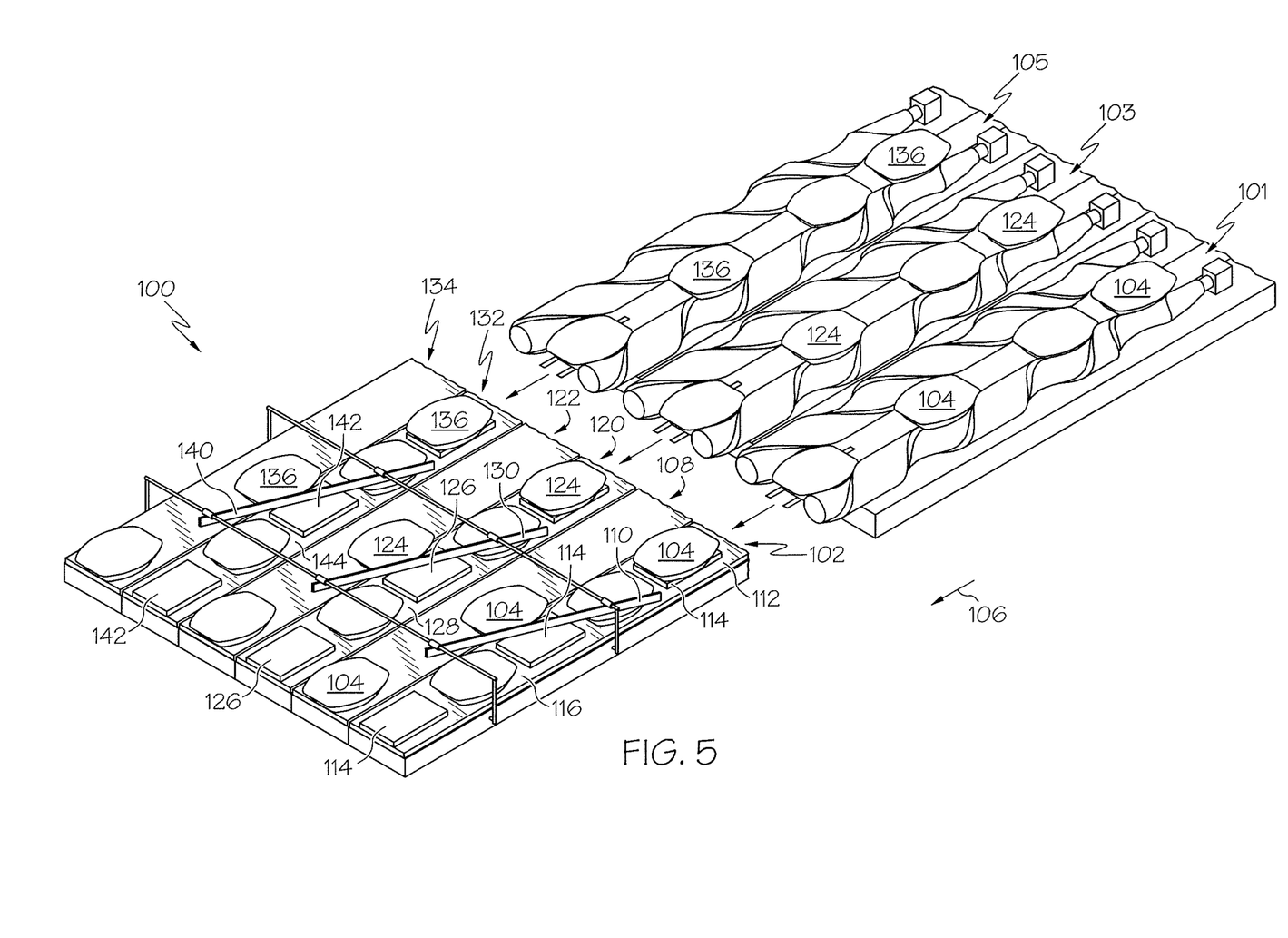
FIG. 5 is a perspective view of a multiple lane conveyor belt system in accordance with the teachings of the present invention.
Figure 6:
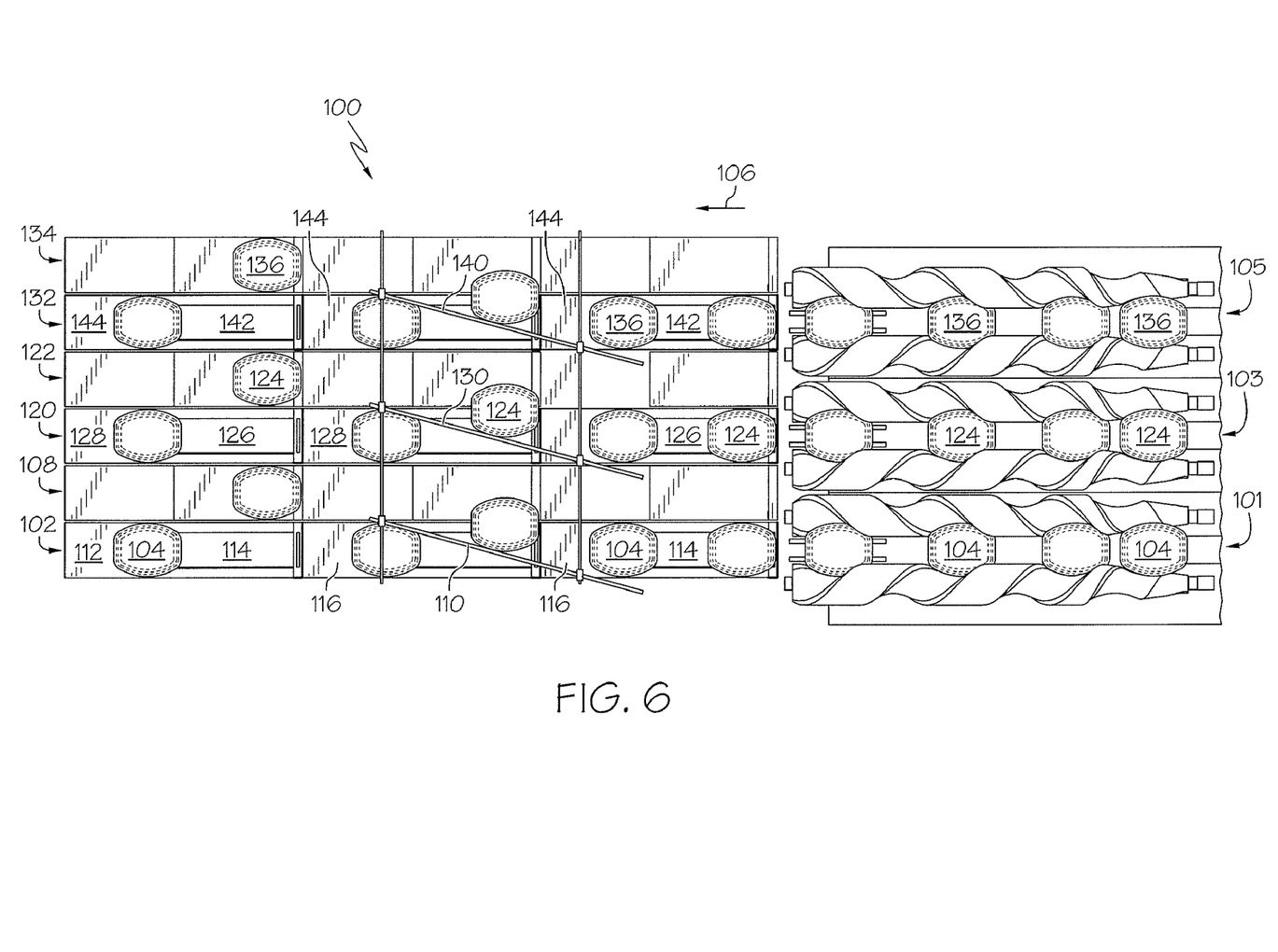
FIG. 6 is a top view of the multiple lane conveyor belt system of FIG. 5.

One such multiple belt arrangement in accordance with the teachings of the present invention is shown in FIGS. 5 and 6. More particularly, FIGS. 5 and 6 illustrate a 3:6 conveyor belt assembly 100, in which three incoming lanes or belts of goods are individually divided into three additional lanes of goods, for a total of six lanes/belts. For instance, a first conveyor belt 102 carries a series of goods 104 along direction 106 from a first incoming production lane 101, while a second conveyor belt 108 is positioned substantially adjacent to the first belt 102 and configured to receive at least a portion of the goods 104 if diverted onto. To divert or deflect a portion of the goods 104 from the first conveyor belt 102 to the second conveyor belt 108, a rod or guide bar 110 is positioned across the top surface or transportation plane 112 of the first conveyor belt 102. As the goods 104 advance along the first conveyor belt 102 in the direction of arrow 106, some of the goods 104 physically contact the guide bar 110, and are thereby caused to change course and divert onto the second conveyor belt 108.

As explained above with respect to the embodiment shown in FIG. 1, only a portion of the goods 104 are configured to directly impact the guide bar 110 and deflect onto the second conveyor belt 108. To determine whether an individual good 104 will impact the guide bar 110 and deflect onto a second or subsequent belt depends upon whether or not that good is positioned on a raised section 114 of the belt. When a good 104 is positioned on a raised section 114 of the belt 102, the good is configured to impact the guide bar 110 when it reaches the portion of the belt to which the guide bar intersects. On the other hand, when a good 104 is positioned on a non-raised section of the belt 116, the good 104 is configured to pass underneath the guide bar 110, and thereby not be shifted onto a subsequent belt.

Adjacent to the first and second conveyor belts (102, 108) are third and fourth conveyor belts (120, 122), which carry a series of goods 124 from a second incoming production lane 103. These goods 124, depending on whether positioned on a raised section 126 or a non-raised section 128 of the belt 120, will either be diverted onto the fourth conveyor belt 122 (i.e., by way of the second guide bar 130), or will pass underneath the guide bar 130 without being diverted.

Adjacent to the third and fourth conveyor belts (120, 122) are fifth and sixth conveyor belts (132, 134), which carry a series of goods 136 from a third incoming production lane 105. These goods 136 can be diverted from the fifth belt 132 onto the sixth belt 134 by way of the third guide bar 140 if positioned on a raised section 142 of the fifth belt 132. When positioned on a non-raised section 144 of the fifth belt 132, the goods 136 are allowed to continue along the belt without being diverted.

Figure 7:
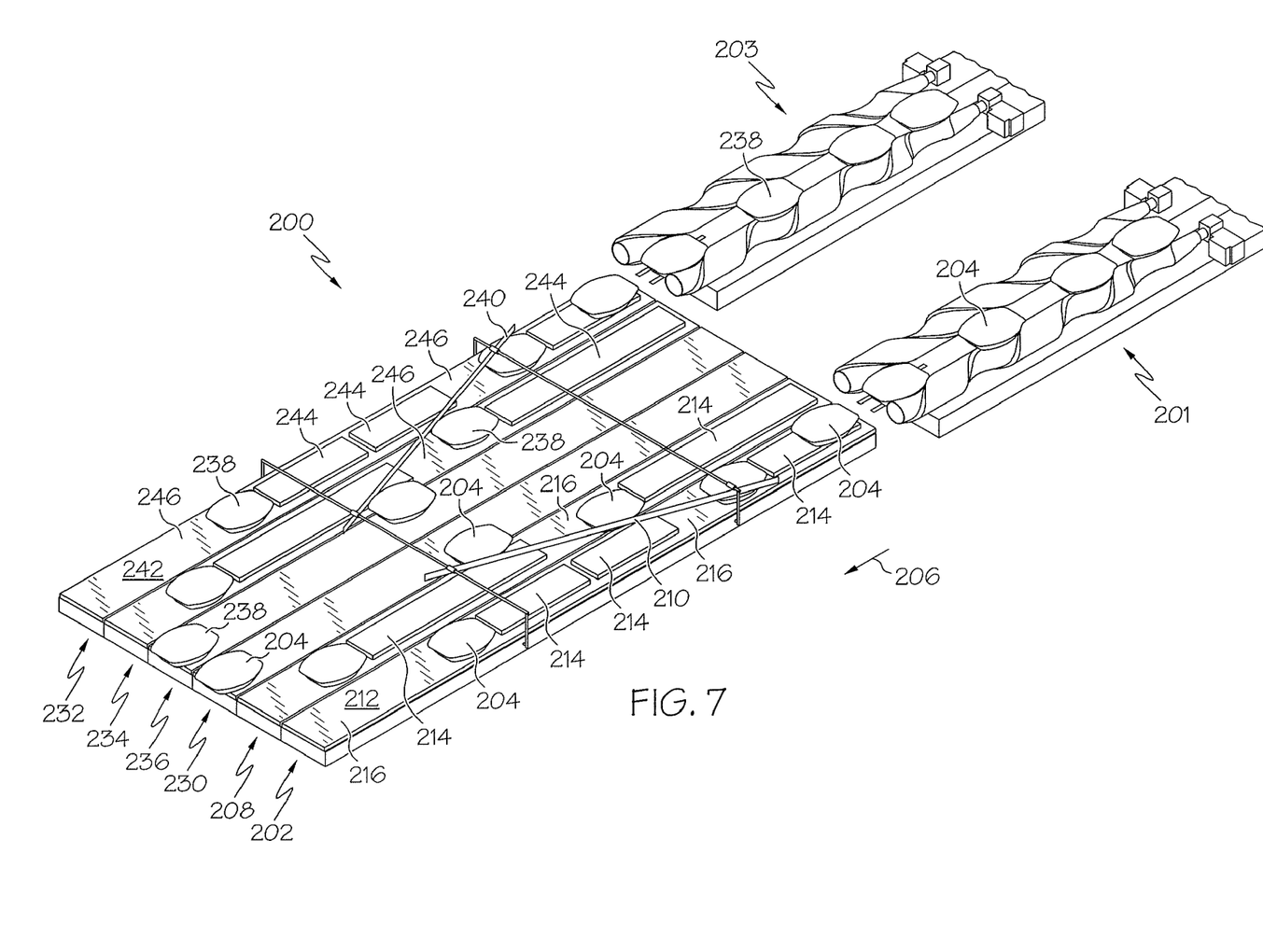
FIG. 7 is a perspective view of another multiple lane conveyor belt system in accordance with the teachings of the present invention.
Figure 8:
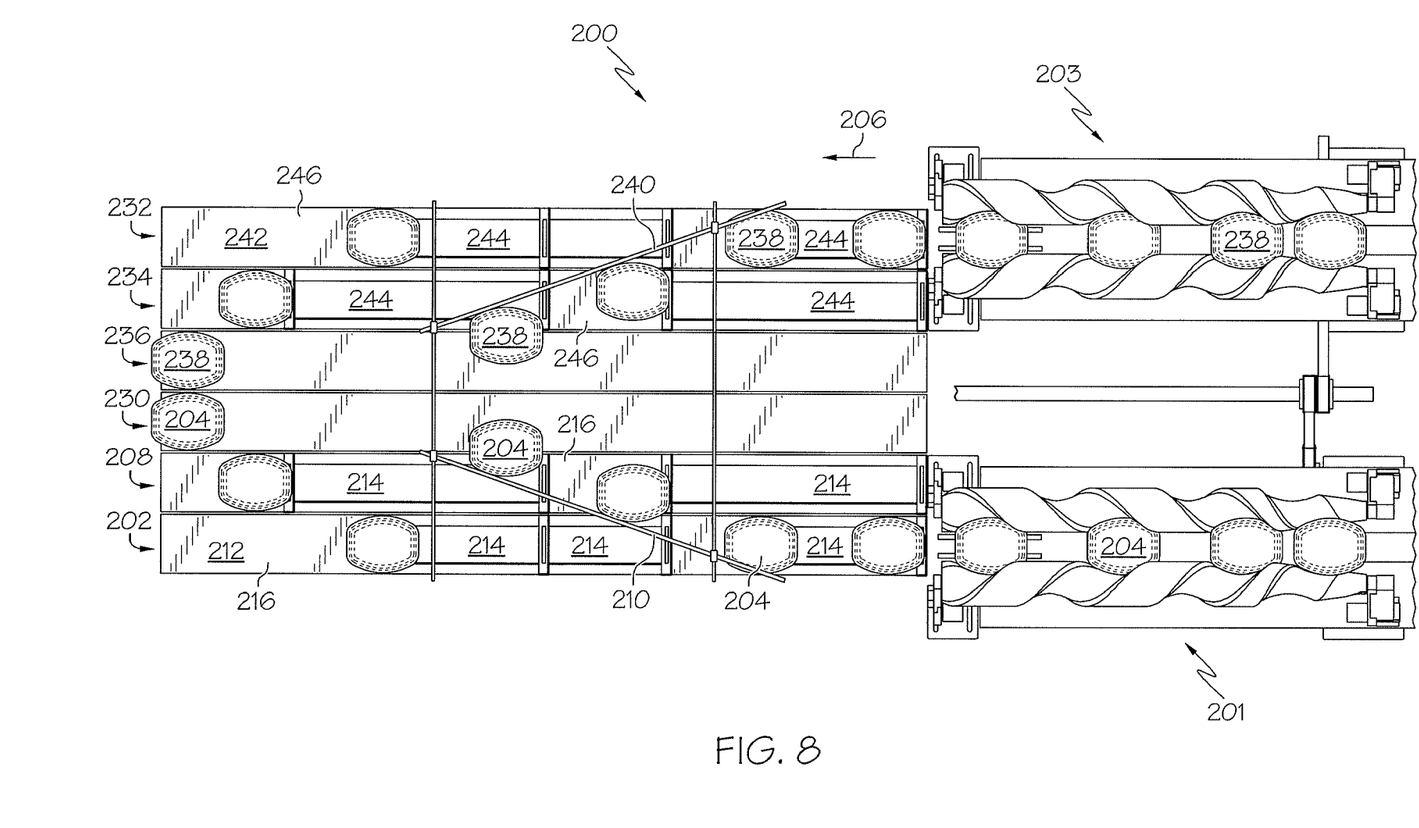
FIG. 8 is a top view of the multiple lane conveyor belt system of FIG. 7.

Another multiple belt arrangement in accordance with the teachings of the present invention is shown in FIGS. 7 and 8. More particularly, FIGS. 7 and 8 illustrate a 2:6 conveyor belt assembly 200, in which each of two incoming lanes or belts of goods are individually divided into three lanes of goods, for a total of six lanes/belts. For instance, a first conveyor belt 202 carries a series of goods 204 along direction 206 from a first production lane 201, while a second conveyor belt 208 is positioned substantially adjacent to the first belt 202 and configured to receive at least a portion of the goods 204 if diverted onto it. To divert or deflect a portion of the goods 204 from the first conveyor belt 202 to the second conveyor belt 208, a rod or guide bar 210 is positioned across the top surface or transportation plane 212 of the first and second conveyor belts 202, 208. As the goods 204 advance along the first conveyor belt 202 in the direction of arrow 206, some of the goods 204 physically contact the guide bar 210, and are thereby caused to change course and divert onto the second conveyor belt 208.

Similarly to the other illustrative embodiments of the present invention described above, only a portion of the goods 204 are configured to directly impact the guide bar 210 and deflect onto the second conveyor belt 208. To determine whether an individual good 204 will impact the guide bar 210 and deflect onto a second or subsequent belt depends upon whether or not that good is positioned on a raised section 214 of the belt. When a good 204 is positioned on a raised section 214 of the belt 202, the good is configured to impact the guide bar 210 when it reaches the portion of the belt to which the guide bar intersects. On the other hand, when a good 204 is positioned on a non-raised section 216 of the belt, the good 204 is configured to pass underneath the guide bar 210, and thereby not be shifted onto a subsequent belt.

In accordance with this illustrative embodiment of the present invention, both the first and second conveyor belts (202, 208) have both raised and non-raised sections (214, 216). In certain embodiments, the first conveyor belt 202 has two raised sections 214 immediately adjacent to one another and then followed by one non-raised section 216, while the second conveyor belt 208 has immediately alternating raised and non-raised sections 214, 216. In accordance with this exemplary illustration, when a good 204 on the first conveyor belt 202 is positioned on one of the raised sections, it is possible to configure the system so that the good 204 will either be diverted onto a raised section 214 of the second conveyor belt 208 or alternatively onto a non-raised section 216 of the second conveyor belt. To determine whether an individual good 204 will be diverted from the first conveyor belt 202 onto a raised or non-raised section of the second conveyor belt 204 is impacted by numerous different factors, such as (but not limited to), the respective speeds of the belts, the size and/or length of the raised and non-raised sections of the belts, as well as the shape and size of the goods to be diverted. Those of skill within the art will understand and appreciate that other factors may also be incorporated into the conveyor belt assemblies of the present invention to influence whether the goods are diverted onto raised or non-raised sections. As such, the present invention is not intended to be limited herein.

Immediately adjacent to the second conveyor belt 208 is a third conveyor belt 230. In accordance with certain aspects of the present invention, the third conveyor belt 230 is configured such that it is positioned at substantially the same elevation as the non-raised sections 216 of the first and second conveyor belts 202, 208. In accordance with illustrative embodiments in which a good 204 is diverted from the first conveyor belt 202 onto a raised section 214 of the second conveyor belt 208, that good 204 will then subsequently be diverted from the second conveyor belt 208 onto the third conveyor belt 230.

Adjacent to the first, second and third conveyor belts (202, 208, 230) are fourth, fifth and sixth conveyor belts (232, 234, 236), which carry a series of goods 238 from a second incoming production lane 203. The fourth conveyor belt 232 carries the series of goods 238 along direction 206, while the fifth conveyor belt 234 is positioned substantially adjacent to the fourth belt and configured to receive at least a portion of the goods 238 if diverted onto. To divert or deflect a portion of the goods 238 from the fourth conveyor belt 232 to the fifth conveyor belt 234, a second rod or guide bar 240 is positioned across the top surface or transportation plane 242 of the fourth and fifth conveyor belts 232, 234. As the goods 238 advance along the fourth conveyor belt 232 in the direction of arrow 206, some of the goods 238 physically contact the guide bar 240, and are thereby caused to change course and divert onto the fifth conveyor belt 234.

Similarly to the other illustrative embodiments of the present invention described above, only a portion of the goods 238 are configured to directly impact the guide bar 240 and deflect onto the fifth conveyor belt 234. To determine whether an individual good 238 will impact the guide bar 240 and deflect onto a subsequent belt depends upon whether or not that good is positioned on a raised section 244 of the belt. When a good 238 is positioned on a raised section 244 of the belt 232, the good is configured to impact the guide bar 240 when it reaches the portion of the belt to which the guide bar intersects. On the other hand, when a good 238 is positioned on a non-raised section 246 of the belt, the good 238 is configured to pass underneath the guide bar 240, and thereby not be shifted onto a subsequent belt.

In accordance with this illustrative embodiment of the present invention, both the fourth and fifth conveyor belts (232, 234) have both raised and non-raised sections (244, 246). In certain embodiments, the fourth conveyor belt 232 has two raised sections 244 immediately adjacent to one another and then followed by one non-raised section 246, while the fifth conveyor belt 234 has immediately alternating raised and non-raised sections 244, 246. In accordance with this exemplary illustration, when a good 238 on the fourth conveyor belt 232 is positioned on one of the raised sections, it is possible to configure the system so that the good 238 will either be diverted onto a raised section 244 of the fifth conveyor belt 234 or alternatively onto a non-raised section 246 of the fifth conveyor belt. To determine whether an individual good 238 will be diverted from the fourth conveyor belt 232 onto a raised or non-raised section of the fifth conveyor belt 234 can be impacted by numerous different factors, such as (but not limited to), the respective speeds of the belts, the size and/or length of the raised and non-raised sections of the belts, as well as the shape and size of the goods to be diverted. Those of skill within the art will understand and appreciate that other factors may also be incorporated into the conveyor belt assemblies of the present invention to influence whether the goods are diverted onto raised or non-raised section. As such, the present invention is not intended to be limited herein.

Immediately adjacent to the fifth conveyor belt 234 is a sixth conveyor belt 236. In accordance with certain aspects of the present invention, the sixth conveyor belt 236 is configured such that it is positioned at substantially the same elevation as the non-raised sections 246 of the fourth and fifth conveyor belts 232, 234. In accordance with illustrative embodiments in which a good 238 is diverted from the fourth conveyor belt 232 onto a raised section 244 of the fifth conveyor belt 234, that good will then subsequently be diverted from the fifth conveyor belt 234 onto the sixth conveyor belt 236.

While various illustrative embodiments incorporating the principles of the present teachings have been disclosed hereinabove, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain and which fall within the limits of the appended claims.

What is claimed is:

1. A system for dividing a flow of objects into two or more lanes of object flow, the system comprising:
   a first conveyor having a belt for transporting a plurality of objects, the belt having a substantially planar first surface configured to directly hold a first object from the plurality of objects being transported and a substantially planar second surface elevated above and substantially parallel to the first surface, the second surface being configured to directly hold a second object from the plurality of objects being transported;
   a second conveyor substantially adjacent to the first conveyor; and
   a guide mounted above the first and second substantially planar surfaces, the guide being configured to divert the second object onto the second conveyor.

2. The system of claim 1, wherein the guide is angled across the first conveyor from a first end to a second end, the second end terminating above the second conveyor.

3. The system of claim 1, wherein the first conveyor belt further comprises a substantially planar third surface adjacent to the substantially planar second surface, the third surface being configured to hold a third object from the plurality of objects being transported.

4. The system of claim 1, wherein the substantially planar first surface of the belt is configured to permit the first object to pass underneath the guide without being diverted onto the second conveyor.

5. The system of claim 1, further comprising a third conveyor configured to receive one or more objects diverted off of the second conveyor by the guide.

6. The system of claim 5, wherein the guide is angled across the first and second conveyor from a first end to a second end, the second end terminating above the third conveyor.

7. A method for dividing a flow of objects into two or more lanes of object flow, the method comprising:
   transporting a plurality of objects along a belt of a first conveyor, the belt having a substantially planar surface configured to directly hold a first object from the plurality of objects being transported and a substantially planar second surface elevated above and substantially parallel to the first surface, the second surface being configured to directly hold a second object from the plurality of objects being transported; and
   diverting the elevated second object positioned on the substantially planar second surface to a second conveyor substantially adjacent to the first conveyor; and
   wherein the substantially planar first surface of the belt is configured to prevent the first object from being diverted onto the second conveyor while being transported along the entirety of the first conveyor belt.

8. The method of claim 7, wherein the step of diverting the elevated second object to the second conveyor comprises diverting the second object with a guide mounted above the first conveyor.

9. The method of claim 7, further comprising diverting a third object positioned on a substantially planar third surface elevated above and substantially parallel to the first surface to a third conveyor, the third conveyor being positioned substantially adjacent to the second conveyor.

* * * * *